United States Patent
Hirano et al.

(10) Patent No.: US 9,212,428 B2
(45) Date of Patent: Dec. 15, 2015

(54) STEEL SHEET FOR CONTAINER AND METHOD OF MANUFACTURING THE SAME

(75) Inventors: Shigeru Hirano, Tokyo (JP); Akira Tachiki, Tokyo (JP); Hirokazu Yokoya, Tokyo (JP); Morio Yanagihara, Tokyo (JP); Makoto Kawabata, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 13/805,071

(22) PCT Filed: Jun. 28, 2011

(86) PCT No.: PCT/JP2011/064754
§ 371 (c)(1),
(2), (4) Date: Dec. 18, 2012

(87) PCT Pub. No.: WO2012/002360
PCT Pub. Date: Jan. 5, 2012

(65) Prior Publication Data
US 2013/0089751 A1     Apr. 11, 2013

(30) Foreign Application Priority Data

Jun. 29, 2010    (JP) ................................. 2010-147860

(51) Int. Cl.
*B32B 15/00* (2006.01)
*C25D 3/54* (2006.01)
(Continued)

(52) U.S. Cl.
CPC ................ *C25D 3/54* (2013.01); *B32B 15/013* (2013.01); *B32B 15/015* (2013.01); *C22C 38/00* (2013.01); *C25D 3/12* (2013.01); *C25D 3/20* (2013.01); *C25D 3/30* (2013.01); *C25D 3/56* (2013.01);
(Continued)

(58) Field of Classification Search
None
See application file for complete search history.

(56) References Cited

U.S. PATENT DOCUMENTS 5,249,447 A      10/1993   Aizawa et al.
2004/0005476 A1*  1/2004   Ando et al. ................... 428/659
(Continued)

FOREIGN PATENT DOCUMENTS

CN    101384753 A    3/2009
CN    101410553 A    4/2009
(Continued)

OTHER PUBLICATIONS

Notice of Allowance dated Sep. 2, 2013 issued in Korean Patent Application No. 10-2012-7033633 (English translation is provided).
(Continued)

*Primary Examiner* — Humera Sheikh
*Assistant Examiner* — Lucas Wang
(74) *Attorney, Agent, or Firm* — Birch, Stewart, Kolasch & Birch, LLP

(57) ABSTRACT

The present invention provides a steel sheet for a container including a cold-rolled steel sheet and a composite film formed on the cold-rolled steel sheet through an electrolysis process in a solution containing: at least one metal ion of an Sn ion, an Fe ion, and an Ni ion; Zr ion; a nitric acid ion: and an ammonium ion, in which the composite film contains at least one element of: Zr of 0.1 to 100 mg/m² in equivalent units of metal Zr; Sn of 0.3 to 20 g/m² in equivalent units of metal Sn; Fe of 5 to 2000 mg/m² in equivalent units of metal Fe; and Ni of 5 to 2000 mg/m² in equivalent units of metal Ni.

12 Claims, 3 Drawing Sheets

(51) Int. Cl.

| | |
|---|---|
| *C25D 7/06* | (2006.01) |
| *C25D 9/10* | (2006.01) |
| *C25D 3/56* | (2006.01) |
| *C25D 5/36* | (2006.01) |
| *C25D 5/50* | (2006.01) |
| *B32B 15/01* | (2006.01) |
| *C25D 3/12* | (2006.01) |
| *C25D 3/20* | (2006.01) |
| *C25D 3/30* | (2006.01) |
| *C25D 3/60* | (2006.01) |
| *C25D 5/48* | (2006.01) |
| *C25D 5/12* | (2006.01) |
| *C25D 9/08* | (2006.01) |
| *C22C 38/00* | (2006.01) |

(52) U.S. Cl.
CPC *C25D 3/562* (2013.01); *C25D 3/60* (2013.01); *C25D 5/12* (2013.01); *C25D 5/36* (2013.01); *C25D 5/48* (2013.01); *C25D 5/50* (2013.01); *C25D 9/08* (2013.01); *C25D 9/10* (2013.01); *Y10T 428/12722* (2015.01); *Y10T 428/12778* (2015.01); *Y10T 428/12937* (2015.01); *Y10T 428/12972* (2015.01)

(56) References Cited

U.S. PATENT DOCUMENTS

| | | | |
|---|---|---|---|
| 2004/0244874 A1 | 12/2004 | Nakayama et al. | |
| 2008/0063896 A1* | 3/2008 | Fujibayashi et al. | 428/684 |
| 2010/0119867 A1* | 5/2010 | Date | 428/633 |
| 2010/0310898 A1 | 12/2010 | Date | |
| 2011/0300402 A1* | 12/2011 | Tachiki et al. | 428/610 |

FOREIGN PATENT DOCUMENTS

| | | | | |
|---|---|---|---|---|
| CN | 101466872 | A | 6/2009 | |
| CN | 101652503 | A | 2/2010 | |
| JP | 1-55055 | B2 | 11/1989 | |
| JP | 2-25784 | B2 | 6/1990 | |
| JP | 2-263523 | A | 10/1990 | |
| JP | 3-33506 | B2 | 5/1991 | |
| JP | 3-236954 | A | 10/1991 | |
| JP | 5-111979 | A | 5/1993 | |
| JP | 5-124648 | A | 5/1993 | |
| JP | 5-147181 | A | 6/1993 | |
| JP | 2004-263252 | A | 9/2004 | |
| JP | 2005-264230 | A | 9/2005 | |
| JP | 2007-284789 | A | 11/2007 | |
| JP | 2008-88552 | A | 4/2008 | |
| JP | 2009-1852 | A | 1/2009 | |
| JP | 2009-1854 | A | 1/2009 | |
| JP | 2009-179848 | | * 8/2009 | C25D 11/36 |
| JP | 2010-13728 | A | 1/2010 | |
| KR | 1020080109804 | A | 12/2008 | |
| KR | 1020090031680 | A | 3/2009 | |
| WO | WO 2007/061011 | A1 | 5/2007 | |
| WO | WO 2011/149047 | A1 | 12/2011 | |

OTHER PUBLICATIONS

Office Action dated Sep. 6, 2013 issued in Taiwanese Patent Application No. 100122430 (English translation is provided).
International Search Report for PCT/JP2011/064754 dated Sep. 20, 2011.
Office Action for Application No. 2011-546458 dated Feb. 14, 2012.
Extended European Search Report dated Nov. 12, 2013, issued in European Patent Application No. 11800824.2.
Chinese Office Action dated Sep. 23, 2014, issued in Chinese Patent Application No. 201180031526.0.

* cited by examiner

STEEL SHEET FOR CONTAINER AND METHOD OF MANUFACTURING THE SAME

TECHNICAL FIELD

The present invention relates to a steel sheet for a container used as a material in can-making, and in particular, exhibiting excellent can-making workability, weldability, film adhesive properties, primary-paint adhesive properties, secondary-paint adhesive properties, resistance to corrosion under a coated film, non-lacquering corrosion resistance, sulphide staining resistance, after-retort rust resistance, and wettability.

The present application claims priority based on Japanese Patent Application No. 2010-147860 filed in Japan on Jun. 29, 2010, the disclosures of which are incorporated herein by reference in their entirety.

BACKGROUND ART

Metal containers used for beverage or food can be broadly categorized into a two-piece can and a three-piece can. For the two-piece can, which is typified by a DI can, drawing and ironing are performed, then, lacquering is applied on the inner surface side of the can, and lacquering and printing are applied on the outer surface side of the can. For the three-piece can, lacquering is applied on a surface corresponding to the inner surface of the can, printing is performed on a surface corresponding to the outer surface of the can, and then, welding is applied to a body portion of the can.

For both types of cans, the lacquering process is a necessary process performed before or after the can-making. With regard to lacquering, a solvent-based lacquer or water-based lacquer is used, and then, baking is performed. Through this lacquering process, waste materials such as waste solvents resulting from these lacquers are produced as industrial wastes, and exhaust gas (mainly carbon dioxide) is emitted to the atmosphere. In recent years, efforts for reducing these industrial wastes and exhaust gas have been undertaken with the aim of achieving global environmental protection. Among them, attention has been paid to a technique of laminating films as an alternative to the lacquers, and this technique is spreading rapidly.

For the two-piece can, there have been provided a large number of inventions concerning a method of manufacturing a can by laminating films, or other related methods. These inventions include, for example:
Patent Document 1 "Method of Manufacturing a Drawn and Ironed Can";
Patent Document 2 "Drawn and Ironed Can";
Patent Document 3 "Method of Manufacturing a Deep-drawn Thinned Can"; and
Patent Document 4 "Coated Steel Sheet for a Drawn and Ironed Can".

For the three-piece can, there have been proposed:
Patent Document 5 "Film-layered Steel Strip for Three-piece Can, and a Method of Manufacturing the Same";
Patent Document 6 "Three-piece Can Having Multiple-layered Organic Film on the Outer Surface of the Can";
Patent Document 7 "Steel Sheet for a Three-piece Can Having Striped Multiple-layered Organic Film"; and
Patent Document 8 "Method of Manufacturing a Striped Laminate Steel Sheet for a Three-piece Can".

In many cases, a chromate film subjected to an electrolysis chromate treatment is used for a steel sheet used as a base for the laminate film. The chromate film has a two-layered structure including a hydrated Cr oxide layer provided on the upper layer of a metal Cr layer. This provides the laminate film (adhesive layer in the case where the film has adhesive agent) with adhesiveness to the steel sheet by way of the hydrated Cr oxide layer of the chromate film. It is said that this appearance of adhesiveness results from a hydrogen bond between a hydroxy group of the hydrated Cr oxide and a function group such as a carbonyl group and an ester group of the laminate film, although details of a mechanism thereof are not clearly found.

Further, a technique employing a Zr compound film in place of the conventional chromate film includes:
Patent Document 9 "Steel Sheet for a Container Exhibiting Excellent Can-making Workability";
Patent Document 10 "Steel Sheet for a Container";
Patent Document 11 "Steel Sheet for a Container"; and
Patent Document 12 "Steel Sheet for a Container Exhibiting Excellent Organic Film Property, and a Method of Manufacturing the Same".

RELATED ART DOCUMENTS

Patent Documents

Patent Document 1: Japanese Patent No. 1571783
Patent Document 2: Japanese Patent No. 1670957
Patent Document 3: Japanese Unexamined Patent Application, First Publication No. H02-263523
Patent Document 4: Japanese Patent No. 1601937
Patent Document 5: Japanese Unexamined Patent Application, First Publication No. H03-236954
Patent Document 6: Japanese Unexamined Patent Application, First Publication No. H05-124648
Patent Document 7: Japanese Unexamined Patent Application, First Publication No. H05-111979
Patent Document 8: Japanese Unexamined Patent Application, First Publication No. H05-147181
Patent Document 9: Japanese Unexamined Patent Application, First Publication No. 2007-284789
Patent Document 10: Japanese Unexamined Patent Application, First Publication No. 2009-1852
Patent Document 11: Japanese Unexamined Patent Application, First Publication No. 2009-1854
Patent Document 12: Japanese Unexamined Patent Application, First Publication No. 2010-13728

DISCLOSURE OF THE INVENTION

Problems to be Solved by the Invention

It is true that the above-described inventions are effective in achieving the global environmental protection. However, in recent years, in the beverage container industry, competition is fierce among a PET bottle, a glass bottle, paper, and other materials in terms of cost and quality. Under such a circumstance, there is an increasing demand for a conventional lacquer applied to the above-described laminate steel sheet for a container and capable of providing excellent film adhesive properties, primary-paint adhesive properties, secondary-paint adhesive properties, resistance to corrosion under a coated film, and non-lacquering corrosion resistance, and providing further improved can-making workability, film adhesive properties, in particular, film adhesive properties after working, resistance to corrosion under a coated film, and non-lacquering corrosion resistance.

In particular, for a Zr film, which is a new film and is alternative to the chromate film, Ni plating or Sn plating is applied, and then, a rinsing treatment for cleaning a plating solution is applied in a conventional manufacturing method, which results in formation of hydroxide of Ni or Sn on an Ni- or Sn-plated layer. Thus, even if the Zr film is formed thereafter, the formed hydroxide film inhibits bonding of the Zr film with the plating metal, which makes it impossible to achieve sufficient performances. Further, this phenomenon employs an increase in pH caused by a hydrogen ion consumption during cathode electrolysis to change a Zr ion into Zr hydrate, thereby forming the Zr film. Thus, this method does not have any effect of cleaning the surface of the plated material, which is an inevitable principle problem.

In view of the circumstances described above, the present invention has been made and an object of the present invention is to provide a steel sheet for a container formed mainly by a Zr film, which exhibits excellent can-making workability, weldability, film adhesive properties, primary-paint adhesive properties, secondary-paint adhesive properties, resistance to corrosion under a coated film, non-lacquering corrosion resistance, sulphide staining resistance, after-retort rust resistance, and wettability.

Means for Solving the Problems

The present invention has been made to solve the above-described problem, and has the following modes.
(1) A first mode of the present invention provides a steel sheet for a container, including a cold-rolled steel sheet, and a composite film formed on the cold-rolled steel sheet through an electrolysis process in a solution containing: at least one metal ion of an Sn ion, an Fe ion, and an Ni ion; a Zr ion; a nitric acid ion; and an ammonium ion, in which the composite film contains at least one element of: Zr of 0.1 to 100 mg/m$^2$ in equivalent units of metal Zr: Sn of 0.3 to 20 g/m$^2$ in equivalent units of metal Sn; Fe of 5 to 2000 mg/m$^2$ in equivalent units of metal Fe; and Ni of 5 to 2000 mg/m$^2$ in equivalent units of metal Ni.
(2) According to the steel sheet for a container described in (1) above, the solution may further contain at least one of a phosphoric acid ion and a phenolic resin, and the composite film may further contain at least one of a phosphoric acid compound of 0.1 to 50 mg/m$^2$ in equivalent units of P, and a phenolic resin of 0.1 to 50 mg/m$^2$ in equivalent units of C.
(3) According to the steel sheet for a container described in (2) above, the solution may further contain a fluorine ion, and the composite film may further contain a fluorine compound of not more than 0.1 mg/m$^2$ in equivalent units of F.
(4) According to the steel sheet for a container described in any one of (1) to (3) above, the cold-rolled steel sheet may have at least one side surface including at least one of an Sn-plated layer containing Sn of 0.3 to 20 g/m$^2$ in equivalent units of metal Sn, and an Ni-plated layer containing Ni of 5 to 2000 mg/m$^2$ in equivalent units of metal Ni.
(5) According to the steel sheet for a container described in (4) above, the at least one side surface of the cold-rolled steel sheet may have the Sn-plated layer, and at least part of the Sn-plated layer may be alloyed with the cold-rolled steel sheet through a tin-reflow treatment.
(6) According to the steel sheet for a container described in (4) above, the at least one side surface of the cold-rolled steel sheet may have the Sn-plated layer, and there may be provided, below the Sn-plated layer, a Ni-plated layer, an Fe—Ni alloy plated layer, or a Ni-diffusion plated layer obtained through a thermal treatment after Ni plating.
(7) According to the steel sheet for a container described in (6) above, the at least one side surface of the cold-rolled steel sheet may have the Sn-plated layer, and all or part of the Sn-plated layer may be alloyed with the cold-rolled steel sheet through a tin-reflow treatment.
(8) A second mode of the present invention provides a method of manufacturing a steel sheet for a container, including: applying an electrolysis process to a cold-rolled steel sheet in a solution containing: at least one metal ion of an Sn ion, an Fe ion, and an Ni ion; a Zr ion; a nitric acid ion, and an ammonium ion, to precipitate on the cold-rolled steel sheet, and forming a composite film containing at least one element of: Zr of 0.1 to 100 mg/m$^2$ in equivalent units of metal Zr; Sn of 0.3 to 20 g/m$^2$ in equivalent units of metal Sn; Fe of 5 to 2000 mg/m$^2$ in equivalent units of metal Fe; and Ni of 5 to 2000 mg/m$^2$ in equivalent units of metal Ni.
(9) According to the method of manufacturing a steel sheet described in (8) above, the cold-rolled steel sheet may have at least one side surface including at least one of an Sn-plated layer containing Sn of 0.3 to 20 g/m$^2$ in equivalent units of metal Sn, and an Ni-plated layer containing Ni of 5 to 2000 mg/m$^2$ in equivalent units of metal Ni.
(10) According to the method of manufacturing a steel sheet described in (8) above, the solution may further contain at least one of a phosphoric acid ion and a phenolic resin, and the composite film may further contain at least one of a phosphoric acid compound of 0.1 to 50 mg/m$^2$ in equivalent units of P, and a phenolic resin of 0.1 to 50 mg/m$^2$ in equivalent units of C.
(11) According to the method of manufacturing a steel sheet described in any one of (8) to (10) above, it may be possible to apply a cleaning process of an immersion process or spray process with hot water at not less than 40° C. for not less than 0.5 second after the composite film is formed on the cold-rolled steel sheet.

Effects of the Invention

According to the present invention, it is possible to obtain a steel sheet for a container having excellent properties suitable for a can, and exhibiting excellent can-making workability, weldability, film adhesive properties, primary-paint adhesive properties, secondary-paint adhesive properties, resistance to corrosion under a coated film, non-lacquering corrosion resistance, sulphide staining resistance, after-retort rust resistance, and wettability.

EMBODIMENTS OF THE INVENTION

Figure 1:
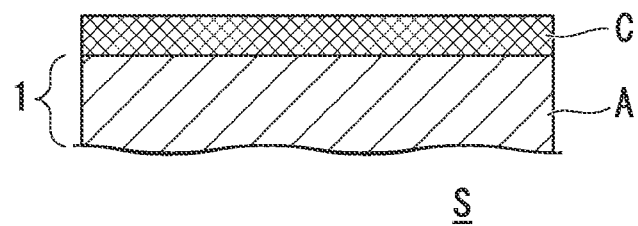
FIG. 1 is a diagram illustrating a configuration of a steel sheet S for a container using a base sheet 1.

The present inventors made a keen study of how to make full use of a Zr film, which is a new film alternative to a chromate film. As a result, the present inventors found that, by applying an electrolysis process with a treatment solution containing, for example, an Sn ion or an Ni ion to form a Zr film or a Zr film having a phosphoric acid film or phenolic resin film combined with the Zr film, it is possible to simultaneously precipitate the Zr film and the film of Sn or Ni, thereby significantly improving properties for a can such as a film adhesive properties and resistance to corrosion under a coated film. It is considered that this is because the bonding with the surface of a material to be treated is strengthened, by precipitating, along with the Zr film, a metal existing in the surface of a plating layer formed by Ni or Sn.

The present inventors also found that, with the presence of a Cr ion in a treatment solution, a chromate film is formed before the simultaneous precipitation of the Zr film and Sn or Ni through the electrolysis process, inhibiting the formation of the Zr film. Thus, it is necessary to remove the Cr ion in the treatment solution.

Hereinbelow, a steel sheet for a can according to an embodiment of the present invention based on the above-described findings will be described.

The steel sheet for a container according to this embodiment provides a steel sheet for a can obtained by plating a cold-rolled steel sheet or a steel sheet with at least one metal of Sn, Fe and Ni (hereinafter, collectively referred to as "base sheet"), and subjecting the base sheet to an electrolysis process in a solution containing: at least one metal ion of an Sn ion, an Fe ion, and an Ni ion; a Zr ion; a nitric acid ion; and an ammonium ion, thereby forming a composite film containing the above-described metallic element on the base sheet. The composite film contains:
(1) Zr of 0.1 to 100 mg/m$^2$ in equivalent units of metal Zr, and
(2) at least one element of Sn of 0.3 to 20 g/m$^2$ in equivalent units of metal Sn, Fe of 5 to 2000 mg/m$^2$ in equivalent units of metal Fe, and Ni of 5 to 2000 mg/m$^2$ in equivalent units of metal Ni.

The steel sheet for a container according to this embodiment has, on the base sheet, a composite film containing (1) predetermined amount of Zr and (2) predetermined amount of at least one element of Sn, Fe, and Ni. More specifically, as described later, each of the elements constituting the composite film contributes to improving at least one properties of the can-making workability, the weldability, the film adhesive properties, the primary-paint adhesive properties, the secondary-paint adhesive properties, the resistance to corrosion under a coated film, the non-lacquering corrosion resistance, the sulphide staining resistance, the after-retort rust resistance, and the wettability.

It should be noted that it is only necessary that the "composite film" contains the above-described metallic elements, and formation thereof is not limited. In other words, each of the metallic elements may be contained as a single-element metal, or may be contained as alloys of the metallic elements, or as a compound such as oxide, hydroxide, halide, and phosphoric acid compounds partially containing the metallic element.

Further, the composition of the composite film may not be uniform. The composite film may have a layered structure in which each constituent element or part of the constituent elements is separated, or constituent elements may form a gradation in a film-thickness direction.

According to the present invention, there is not any particular limitation to the base sheet. It may be possible to use a steel sheet normally used as a material for a container. Further, there is not any particular limitation to a material or a method for manufacturing the base sheet. The base sheet is manufactured through normal processes used for manufacturing the steel sheet, and then applying hot rolling, pickling, cold rolling, annealing, temper rolling, or other processes. In the case where a surface-treated layer containing one or more elements of Ni and Sn is added to the base sheet, there is not any particular limitation to the addition method. For example, it may be possible to use a publicly known technique such as electroplating, vacuum deposition and sputtering, or use a combination of heating treatments for adding a diffusion layer. Further, the nature of the present invention remains unchanged if Fe—Ni alloy plating is applied for Ni.

In order to form a high-quality composition layer, it is preferable that the base sheet is a steel sheet obtained by, before Sn plating, applying an Ni-plated layer, an Fe—Ni alloy plated layer, and an Ni-diffusion plated layer through a thermal treatment applied after the Ni plating, and it is more preferable that the base sheet is obtained by, after the Sn plating, alloying all or part of the Sn plating with a base metal through a tin-reflow treatment.

According to the steel sheet for a container according to this embodiment, a composite film is formed on the upper layer of the above-described steel sheet (base sheet). The thickness of the base sheet (base steel sheet) is determined depending on applications.

Next, roles of the metals constituting the composite film will be described.

Zr is an essential component for the composite film of the steel sheet for a container according to this embodiment.

In the composite film, Zr contributes to obtaining the film adhesive properties, the primary-paint adhesive properties, the secondary-paint adhesive properties, the resistance to corrosion under a coated film, and the non-lacquering corrosion resistance. Additionally, Zr also contributes to preventing sulfuration and blackening with which a sulfur compound existing in contents reacts with the base steel, Sn and Ni to form black sulfides. Zr forms Zr oxide, Zr hydroxide, Zr fluoride, Zr phosphate or other Zr compound, or composites thereof. These Zr compounds exhibit excellent film adhesive properties, primary-paint adhesive properties, secondary-paint adhesive properties, resistance to corrosion under a coated film, non-lacquering corrosion resistance, and sulphide staining resistance.

When Zr in the composite film reaches 0.1 mg/m$^2$ or more in terms of metal Zr amount, the film adhesive properties, the primary-paint adhesive properties, the secondary-paint adhesive properties, the resistance to corrosion under a coated film, and the non-lacquering corrosion resistance start to improve. However, in practice, it is preferable to set Zr to 1 mg/m$^2$ or more in equivalent units of metal Zr to obtain the stable and adequate corrosion resistance and the adhesiveness.

Further, with the increase in the amount of Z in the composite film, the effect of improving the film adhesive properties, the primary-paint adhesive properties, the secondary-paint adhesive properties, the resistance to corrosion under a coated film, and the non-lacquering corrosion resistance increases. However, in the case where the amount of Zr exceeds 100 mg/m$^2$ in equivalent units of metal Zr, the film adhesive properties, the primary-paint adhesive properties, and the secondary-paint adhesive properties of the composite film itself deteriorate, and the electric resistance increases, deteriorating weldability. Further, the excellent non-lacquering corrosion resistance resulting from the sacrificial protection by metal Sn is impaired, and uniform solubility of Sn in the contents containing organic acid is inhibited. For these reasons, it is necessary to set the amount of attached Zr film to be in the range of 0.1 to 100 mg/m$^2$ in terms of metal Zr amount.

As described above, the composite film contains at least one element of Sn, Fe, and Ni. Next, preferable amount of each of the elements contained will be described.

[Sn: 0.3 to 20 g/m² in Equivalent Units of Metal Sn]

Sn is normally contained in the composite film in a form of a metal or alloy. However, Sn may be contained in a form of a compound such as an oxide. Sn provides excellent can-making workability, resistance to corrosion under a coated film, non-lacquering corrosion resistance, and weldability. To achieve these effects, it is necessary for the composite film to contain Sn of 0.3 g/m² or more in the form of metal Sn. It is desirable for the composite film to contain Sn of 0.5 g/m² or more in equivalent units of metal Sn to obtain rapid and sufficient weldability, and Sn of 2 g/m² or more in equivalent units of metal Sn to obtain sufficient non-lacquering corrosion resistance. With the increase in the amount of Sn attached, the effects obtained from Sn of providing improved can-making workability, resistance to corrosion under a coated film, non-lacquering corrosion resistance, and weldability increase. However, in the case where the amount of Sn exceeds 20 g/m², the effect of Sn saturates, and the excessive amount of Sn leads to an economic disadvantage. Thus, the amount of Sn attached may be set to 20 g/m² or less in equivalent units of metal Sn. Further, by applying Sn reflow treatment (tin-reflow treatment) after the Sn plating, an Sn alloy layer is formed, thereby further improving the corrosion resistance.

[Fe: 5 to 2000 mg/m² in Equivalent Units of Metal Fe]

Fe is normally contained in the composite film in a form of a metal or alloy. However, Fe may be contained in a form of a compound such as an oxide. Fe provides excellent weldability. To obtain this effect, it is necessary for the composite film to contain Fe of 5 mg/m² or more in equivalent units of metal Fe. With the increase in the amount of Fe attached, the effect of improving the weldability increases. However, in the case where the amount of Fe exceeds 2000 mg/m², the effect of improving the weldability saturates, and the excessive amount of Fe leads to an economic disadvantage. Thus, the amount of Fe attached is set to be not less than 5 mg/m² and not more than 2000 mg/m² in equivalent units of metal Fe.

[Ni: 5 to 2000 mg/m² in Equivalent Units of Metal Ni]

Ni is normally contained in the composite film in a form of a metal or alloy. However, Ni may be contained in a form of a compound such as an oxide. Ni has an effect on the primary-paint adhesive properties, the secondary-paint adhesive properties, the film adhesive properties, the resistance to corrosion under a coated film, and the weldability. To achieve these effects, it is necessary for the composite film to contain Ni of 5 mg/m² or more in equivalent units of metal Ni. To obtain rapid and sufficient weldability and sufficient resistance to corrosion under a coated film, it is desirable to add Ni of 150 mg/m² or more. With the increase in the amount of Ni attached, the excellent effect obtained from Ni of improving the film adhesive properties, the resistance to corrosion under a coated film, and the weldability increases. However, in the case where the amount of Ni exceeds 2000 mg/m² or more, the effect of improving these properties saturates, and the excessive amount of Ni leads to an economic disadvantage. Thus, the amount of Ni attached is set to be not less than 5 mg/m² and not more than 2000 mg/m² in equivalent units of metal Ni.

It should be noted that, in the case where the composite film contains Cr, an improvement in the resistance to corrosion under a coated film can be expected. However, as described above, with the existence of a Cr ion in the treatment solution, before the Zr film and Sn, Ni, or other element are simultaneously precipitated, a chromate film is formed through the electrolysis process, whereby the formation of the Zr film is inhibited. This leads to a deterioration in performances such as weldability. Thus, according to the present invention, it is preferable that the composite film does not contain Cr.

As a method for adding the composite film described above on the base sheet, there is a method of applying a cathodic electrolysis process (hereinafter, also simply referred to as "electrolysis process") in a solution containing: at least one metal ion of an Sn ion, an Fe ion, and an Ni ion; a Zr ion; a nitric acid ion; and an ammonium ion. It is preferable that, in particular, the electrolysis process is performed under conditions in which these elements are precipitated simultaneously.

It should be noted that there is a method of simply immersing the steel sheet in the solution described above to form the film. However, with this immersion method, the base is subjected to etching to form the Zr film, and attachment does not uniformly occur, which makes it difficult to form the composite film of the steel sheet for a container according to this embodiment.

With the cathodic electrolysis process, electric charges are forcibly moved, pH increases due to hydrogen ion consumption at an interface of the steel sheet. Further, the Zr film has an attachment-facilitating effect. These make it possible to obtain an uniform film through a process applied within a short period of time ranging from several seconds to several tens of seconds, which provides significant industrial advantage. Further, a nitric acid ion is reduced through the cathode electrolysis, a hydroxide ion is discharged, whereby pH of the interface of the steel sheet is more likely to increase. When insoluble anode is used, an ammonium ion is reduced to be a nitrous acid ion or nitric acid ion to supply the nitric acid ion consumed at the cathode, and pH is made stable, which are also advantages of the cathodic electrolysis process.

It should be noted that, according to the steel sheet for a container according to this embodiment, it is preferable that the composite film is formed by:

(1) a Zr film layer formed mainly by Zr, and
(2) a film layer formed mainly by at least one element of Sn, Fe, and Ni, and, the surface of the composite film is formed by the (1) Zr film layer formed mainly by Zr.

More specifically, it is preferable that, by applying an electrolysis process to a base sheet in a solution containing: at least one metal ion of Sn ion, Fe ion, and Ni ion; Zr ion; nitric acid ion; and ammonium ion to form a composite film containing compounds of the metals described above on the base sheet, the steel sheet for a container has the composite film configured such that a film layer formed mainly by at least one element of Sn, Fe, and Ni is formed on a base sheet, and above the film layer, a Zr film layer formed mainly by Zr is formed, in other words, the composite film has a gradation of metal elements constituting the film.

Further, in the steel sheet for a container according to the present invention, from the viewpoint of enhancing the film adhesive properties between the composite film and the base sheet after working, it is preferable that the composite film contains:

(1) Zr of 0.1 to 100 mg/m² in equivalent units of metal Zr,
(2) Sn of 0.3 to 20 g/m² in equivalent units of metal Sn, Fe of 5 to 2000 mg/m² in terms of metal Fe amount, and Ni of 5 to 2000 mg/m² in equivalent units of metal Ni, and
(3) at least one of a phosphoric acid compound of 0.1 to 50 mg/m² in equivalent units of P and a phenolic resin of 0.1 to 50 mg/m² in equivalent units of C.

The composite film containing (3) at least one of the phosphoric acid and the phenolic resin can be obtained by applying an electrolysis process to a steel sheet in a solution in which at least one of fluorine ion, phosphoric acid ion, and phenolic resin is further added to the above-described solution.

It should be noted that the composite film containing (3) at least one of the phosphoric acid and the phenolic resin can be formed by applying the electrolysis process in a similar manner as described above.

The fluorine ion forms a complex, and contributes to stabilization of the Zr ion. Thus, by adding the fluorine ion for the purpose of stabilizing Zr in an electrolyte solution (forming chelate and diffusing), the allowable range of pH, concentration and temperature increases, which makes operations easy.

However, when absorbed in the composite film, F causes a deterioration in the adhesiveness (secondary adhesive properties) or after-retort rust resistance in a high-temperature sterilization process such as a retort process, or resistance to corrosion under a coated film, although not having any effect on the normal adhesiveness (primary adhesive properties) of paint or film. It is considered that this is because the fluorine ion in the film elutes to steam or etching solution, decomposes the bonding with the organic film or corrodes the base steel sheet. Thus, in the case where the amount of fluorine compound contained in the composite film exceeds $0.1$ mg/m$^2$ in equivalent units of F, the deterioration in these properties becomes apparent. For these reasons, the amount of fluorine compound contained in the composite film is set preferably to $0.1$ mg/m$^2$ or less in equivalent units of F.

It should be noted that, in the case where the fluorine remains in the composite film as described above, the film adhesive properties, the secondary-paint adhesive properties and other properties deteriorate. Thus, when used, the fluorine needs to be removed as much as possible with hot-water cleaning. The fluorine needs to be removed as much as possible with hot-water cleaning immediately after the composite film is formed. The purpose of cleaning with the hot water is to clean the treatment solution and improve the wettability. In particular, cleaning with the hot water improves the wettability, and hence, suppresses occurrence of pinholes caused by repellence of lacquer. This significantly improves the lacquering properties, contributing to securing quality of the lacquered steel sheet. In order to sufficiently obtain the wettability, the surface tension of 31 mN/m or more is necessary, and the surface tension of 35 mN/m or more is preferable. The surface tension in this specification is a value measured with a method specified in JIS K 6768. Under this standard, test solutions having various surface tensions are applied, and measurement is performed in a wet condition with the test solutions. Thus, if the wet condition with the test solution having high surface tension is favorable, the composite film has excellent wettability. Thus, the wettability can be evaluated in association with the surface tension of the test solution.

Although details of how this hot-water cleaning improves the wettability are not known, it is considered that this is because hydrophilic functional groups increase in the outermost layer of the film. To achieve these effects, it is necessary to apply a cleaning process including an immersion process or spray process with hot water at 40° C. or more for 0.5 sec or more. From the industrial viewpoint, it is preferable to apply the spray process from which the cleaning-facilitating effect resulting from flowing of liquid is expected, or a combination of the spray process and the immersion process.

Further, the effect of the hot-water cleaning includes removal of the fluorine ion entering the composite film in the case where the solution contains the fluorine ion. As described above, fluorine entering the composite film may deteriorate the film adhesive properties, the secondary-paint adhesive properties and the after-retort rust resistance, or the resistance to corrosion under a coated film of the composite film. To set the amount of fluorine compound contained to be not more than $0.1$ mg/m$^2$ in equivalent units of F to avoid such a deterioration, it is only necessary to apply the cleaning process including the immersion process and/or spray process using the hot water after the formation of the composite film. Further, by setting the process temperature higher or setting the process duration longer, it is possible to reduce the amount of F. Thus, to set the amount of fluorine compound contained in the film to be not more than $0.1$ mg/m$^2$ in equivalent units of F, it is only necessary to apply the immersion process or spray process with hot water at 40° C. or more for 0.5 sec or more. In the case where the water temperature is less than 40° C. or the process duration is less than 0.5 sec, the amount of fluorine compound contained in the composite film cannot be reduced to be $0.1$ mg/m$^2$ or less in equivalent units of F, so that the properties described above cannot be achieved.

The purpose of adding the phosphoric acid compound to the composite film is to obtain the film adhesive properties, the primary-paint adhesive properties, the secondary-paint adhesive properties, and in particular, the film adhesive properties after working. The phosphoric acid compound includes Fe phosphate which is formed through reaction with the base sheet, Sn phosphate, Ni phosphate and Zr phosphate, a film such as the phosphate-phenolic resin film, and a composite thereof. These phosphoric acid compounds have excellent resistance to corrosion under a coated film, film adhesive properties, primary-paint adhesive properties, and secondary-paint adhesive properties. Thus, with the increase in the phosphoric acid compound, the resistance to corrosion under a coated film, the film adhesive properties, primary-paint adhesive properties, and the secondary-paint adhesive properties increase. Then, if the phosphoric acid compound in the composite film reaches $0.1$ mg/m$^2$ or more in equivalent units of P, it is possible to obtain the practically adequate level of the resistance to corrosion under a coated film, the film adhesive properties, the primary-paint adhesive properties, and the secondary-paint adhesive properties. Further, with the increase in the amount of phosphoric acid compound, the effect of improving the resistance to corrosion under a coated film, the film adhesive properties, the primary-paint adhesive properties, and the secondary-paint adhesive properties also further increases. However, in the case where the amount of phosphoric acid compound exceeds 50 mg/m$^2$ in equivalent units of P, the amount of phosphoric acid compound is undesirably high, deteriorating the film adhesive properties, the primary-paint adhesive properties, and the secondary-paint adhesive properties of the composite film. Further, the electrical resistance increases, deteriorating the weldability. For these reasons, it is preferable to set the amount of phosphate in the range of 0.1 to 50 mg/m$^2$ in equivalent units of P.

In the composite film, the phenolic resin film contributes to obtaining the film adhesive properties, the primary-paint adhesive properties, the secondary-paint adhesive properties, and in particular, the film adhesive properties after working. Since the phenolic resin is an organic substance, the phenolic resin itself has extremely excellent adhesiveness to the paint and the laminate film. In the case where the surface-treated layer is subjected to working such that the surface-treated layer largely deforms, cohesive failure occurs in the surface-treated layer itself due to the working, possibly deteriorating the adhesiveness. However, the phenolic resin has an effect of significantly improving the adhesiveness after the working of the composite film. Thus, with the increase in the phenolic resin, the film adhesiveness, the primary-paint adhesive properties, and the secondary-paint adhesive properties further improve. In the case where the amount of phenolic resin in the composite film reaches 0.1 mg/m$^2$ or more in equivalent units of C, it is possible to secure the practically adequate level of adhesiveness. Further, with the increase in the amount of phenolic resin, the effect of improving the film adhesiveness, the primary-paint adhesive properties and the secondary-paint adhesive properties further increases. However, in the case where the amount of phenolic resin in the composite film exceeds 50 mg/m$^2$ in equivalent units of C, the electrical resistance increases, deteriorating the weldability. Thus, it is preferable to set the amount of phenolic resin to be in the range of 0.1 to 50 mg/m$^2$ in equivalent units of C.

The phenolic resin used in the steel sheet for a container according to this embodiment includes, for example, a polymer expressed by following Formula (I). This can be manufactured by forming condensation polymer of phenolic compound, naphthol compound or bisphenols (bisphenol A or F), and formaldehyde, and then introducing functional groups $X^1$ and $X^2$ using formaldehyde and amine. Formalin is generally used as the formaldehyde. Although the molecular weight of the polymer is not particularly limited, the molecular weight is set generally in the range of approximately 1000 to 1000000, preferably in the range of approximately 1000 to 100000, more preferably in the range of approximately 1000 to 10000. The molecular weight can be measured with a gel permeation chromatography after the film is detached.

[Formula 1]

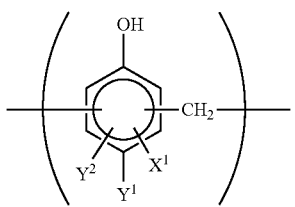

(I)

In Formula (I), $X^1$ independently represents a hydrogen atom or $Z^1$ group expressed by following Formula (II) in each structural unit, $Y^1$ represents a hydrogen atom, a hydroxy group, an alkyl group with $C_1$ to $C_5$, a hydroxy alkyl group with $C_1$ to $C_5$, an aryl group with $C_6$ to $C_{12}$, a benzyl group, or a group expressed by following Formula (III), and $Y^2$ represents a hydrogen atom. Further, in the case where $Y^2$ exists adjacent to $Y^1$, $Y^1$ and $Y^2$ may integrally form a condensed benzene ring including a bonding between $Y^1$ and $Y^2$. In this specification, the ratio of $Z^1$ group+$Z^2$ group introduced is 0.2 to 1.0 piece per benzene ring.

[Formula 2]

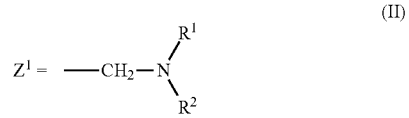

(II)

In Formula (II), $R^1$ and $R^2$ independently represent a hydrogen atom, an alkyl group with $C_1$ to $C_{10}$ or hydroxy alkyl group with $C_1$ to $C_{10}$.

[Formula 3]

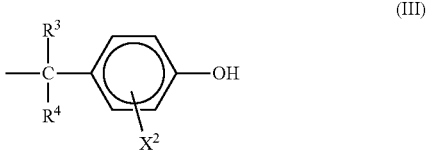

(III)

In Formula (III), $R^3$ and $R^4$ independently represent a hydrogen atom, an alkyl group with $C_1$ to $C_{10}$, or hydroxy alkyl group with $C_1$ to $C_{10}$. In the case where $Y^1$ is a group expressed by Formula (III) described above, $X^2$ represents a hydrogen atom or $Z^2$ group expressed by General Formula (IV) in each structural unit expressed by Formula (I).

[Formula 4]

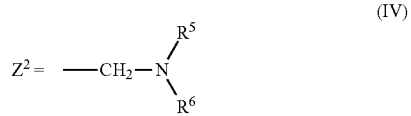

(IV)

In Formula (IV), $R^5$ and $R^6$ independently represent a hydrogen atom, an alkyl group with $C_1$ to $C_{10}$, or a hydroxy alkyl group with $C_1$ to $C_{10}$.

It should be noted that, for the steel sheet for a container according to this embodiment, it may be possible to measure the amount of Sn, the amount of Ni, the amount of Fe, the amount of Zr, the amount of P, and the amount of F contained in the composite film, for example, through a quantitative analysis method such as fluorescent X-ray analysis. Further, in the case where a metal same as that forming the steel sheet to be treated (base sheet) is attached, it is only necessary to apply the treatment to a different metal sheet such as a copper sheet, and perform the measurement. Further, the amount of C contained in the phenolic resin film can be measured by subtracting the amount of C existing in the steel sheet using a total organic carbon analyzer (TOC).

Depending on manufacturing facility or manufacturing speed (ability), concentrations of ions in the treatment solution used in the cathodic electrolysis process for forming the composite film may be adjusted so as to be:

concentration of Sn ion, Fe ion, and Ni ion: approximately 10 to 30000 ppm;

concentration of Zr ion: approximately 100 to 20000 ppm;

concentration of ammonium ion: approximately 100 to 20000 ppm;

concentration of nitric acid ion: approximately 100 to 20000 ppm;

concentration of phosphoric acid ion: approximately 100 to 50000 ppm;

concentration of phenolic resin: approximately 50 to 2000 ppm; and concentration of fluorine ion: approximately 500 to 30000 ppm.

EXAMPLES

Next, using Examples, the present invention will be described more in detail. However, the present invention is not limited to these Examples, and various modifications are possible within the scope of the present invention.

[Manufacture of Base Sheet]

Figure 2:
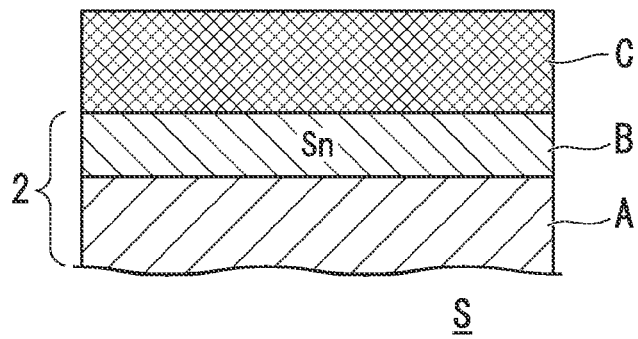
FIG. 2 is a diagram illustrating a configuration of a steel sheet S for a container using a base sheet 2.
Figure 3:
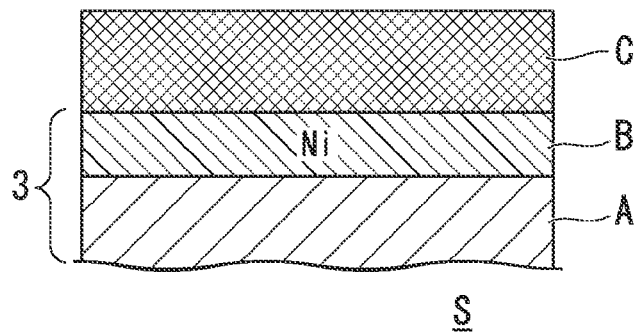
FIG. 3 is a diagram illustrating a configuration of a steel sheet S for a container using a base sheet 3.
Figure 4:
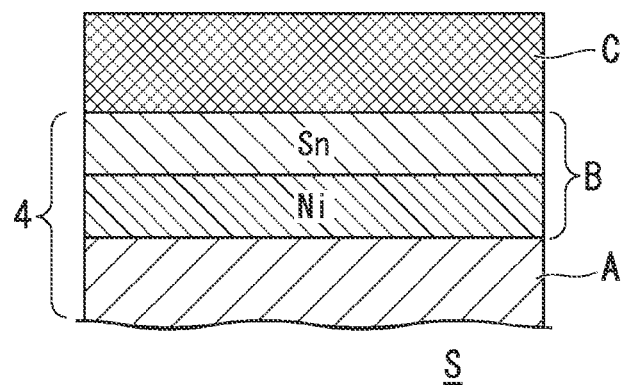
FIG. 4 is a diagram illustrating a configuration of a steel sheet S for a container using a base sheet 4.
Figure 5:
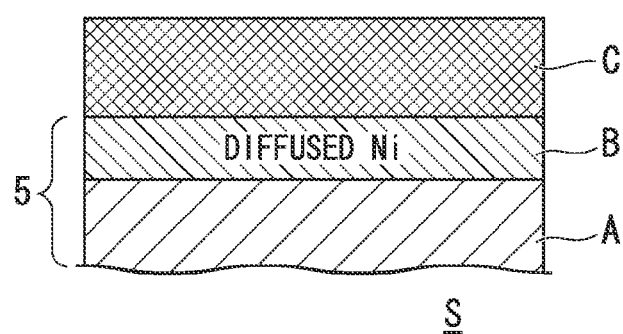
FIG. 5 is a diagram illustrating a configuration of a steel sheet S for a container using a base sheet 5.
Figure 6:
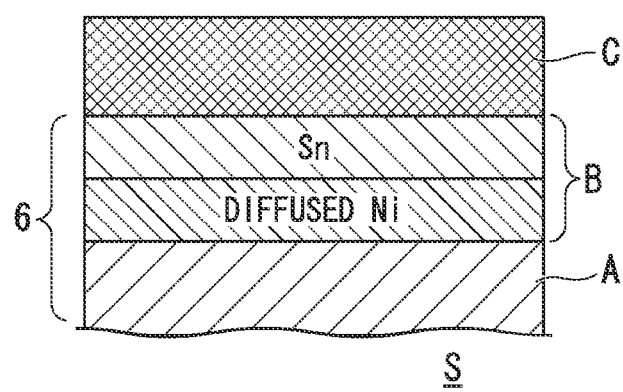
FIG. 6 is a diagram illustrating a configuration of a steel sheet S for a container using a base sheet 6.
Figure 7:
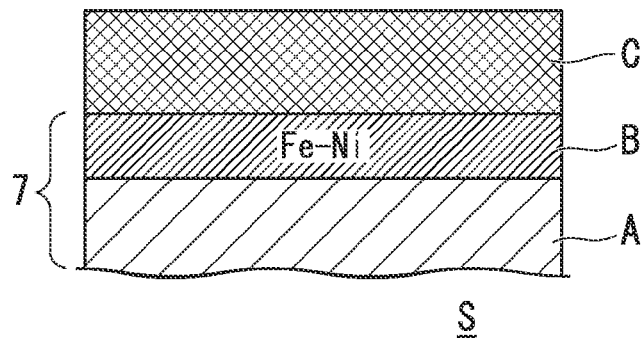
FIG. 7 is a diagram illustrating a configuration of a steel sheet S for a container using a base sheet 7.
Figure 8:
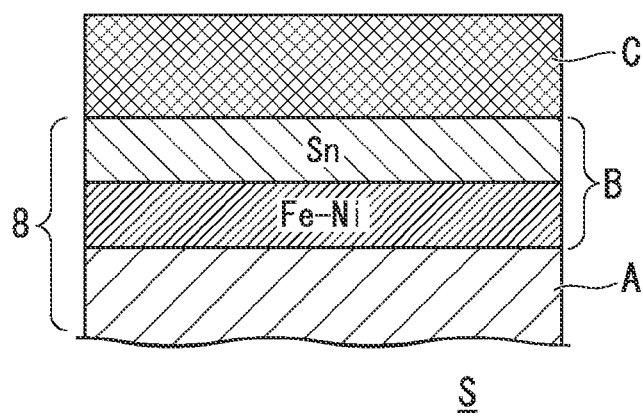
FIG. 8 is a diagram illustrating a configuration of a steel sheet S for a container using a base sheet 8.
Figure 9:
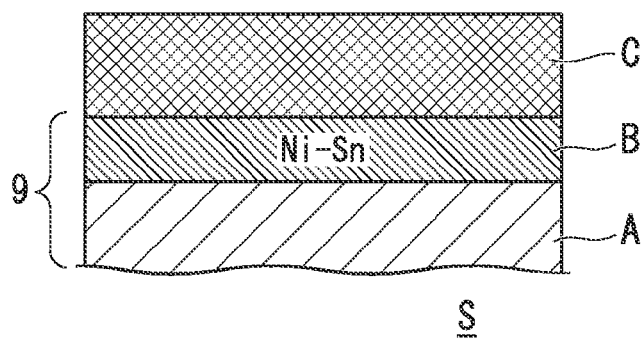
FIG. 9 is a diagram illustrating a configuration of a steel sheet S for a container using a base sheet 9.

Table 1 shows methods of manufacturing base sheets 1 to 9 having a thickness in the range of 0.15 to 0.25 mm used in Examples 1 to 19 and Comparative Examples 1 to 8. FIG. 1 to FIG. 9 are diagrams illustrating configurations of steel sheets S for a container used for the base sheets 1 to 9. In the drawings, numbers 1 to 9 represent a base sheet number, A represents a cold-rolled steel sheet, B represents plating, C represents a composite film, and S represents a steel sheet for a container. Note that, in the drawings, at least part of an Sn-plated layer may be alloyed with a cold-rolled steel sheet through a tin-reflow treatment.

Further, Table 2A and Table 2B show base sheets used for Examples 1 to 19 and Comparative Examples 1 to 8. Note that, in Examples 9, 11 to 15, 23 to 25, 27 and 28, and Comparative Example 1 and Comparative Example 6, after the Sn plating, electric heating was applied to melt Sn, and then a cooling treatment was applied by immersing the sheets in hot water at 80° C.

[Formation of Composite Film]

Next, a composite film was added to the surface of each of the base sheets under conditions for treatment of composite films shown in Table 3A and Table 3B. More specifically, in a state where the base sheets were immersed in the treatment solution having an appropriate amount of chemical agents described below, a cathodic electrolysis process was performed on the basis of the electrolysis process duration and electric current density shown in Table 3A and Table 3B, thereby forming the composite film.

The chemical agents used include commercially available Zr nitrate, Zr ammonium fluoride, hydrofluoric acid, ammonia nitrate, Sn nitrate, Fe nitrate, Ni nitrate, and phosphoric acid.

Further, as for a low-molecular phenolic resin, a low-molecular phenolic resin having an average molecular weight of 3000, which is a polymer having $Z^1$=—$CH_2N(CH_3)_2$ for $X^1$, $Y^1$=$Y^2$=hydrogen atom, and a ratio of $Z^1$ group introduced of 0.5 piece per benzene ring in the general Formula (I) described above, was used in a form of water-soluble polymer having a solid content of 2.0 g/L and pH of 6.0 (adjusted with phosphoric acid).

[Rinsing Treatment]

After the composite film was formed through the above-described processes, a rinsing treatment was applied through the following treatment method (a) or (b) to control the amount of F in the composite film.

(a) Immersing the composite film in hot water at 40° C. or more.

(b) Immersing the composite film in water at ordinary temperature of approximately 15° C.

[Performance Evaluation]

For test materials having the above-described treatments applied thereto, the amount of Zr, P, C, F, Sn, Fe, and Ni attached to the composite film was measured. The results of the measurement are shown in Table 4A and Table 4B. Further, performance evaluation on the following items (A) to (J) was performed. The results of the evaluation are shown in Table 5A and Table 5B.

(A) Can-Making Workability

A PET film having a thickness of 20 μm was laminated on both sides of the test material at 200° C.; can-making working was performed sequentially through drawing and ironing; and formed items were evaluated in four grades (A: Excellent, B: Good, C: Defect occurred, and D: Broken and unable to continue working).

(B) Weldability

Under conditions of welding wire speed of 80 m/min, the test materials were welded with a wire seam welder while electric current were varied. Then, weldability was systematically evaluated in four grades (A: Excellent, B: Good, C: poor, and D: Unable to weld) based on the appropriate electrical-current range including the minimum electrical-current value at which the sufficient welding strength can be obtained, and the maximum electrical-current value at which welding defects such as spatter and welding spatter start to become conspicuous.

(C) Film Adhesive Properties

A PET film having a thickness of 20 μm was laminated on both sides of the test material at 200° C.; the test material was subjected to drawing-ironing to form a can body; the can body was subjected to a retort process at 125° C. for 30 minutes; and the film detachment state was evaluated in four grades (A: No detachment was found, B: Minor detachment occurred but practically ignorable, C: Minor detachment occurred, and D: Most part was detached).

(D) Primary-Paint Adhesive Properties

An epoxy-phenolic resin was applied to the test material; the rein was baked at 200° C. for 30 minutes; then, cross-cut having a depth that reaches a base iron was applied at 1 mm intervals; the resin was detached with a tape; and, a detached state was evaluated in four grades (A: No detachment was found, B: Minor detachment occurred but practically ignorable, C: Minor detachment occurred, and D: Most part was detached).

(E) Secondary-Paint Adhesive Properties

An epoxy-phenolic resin was applied to the test material; the rein was baked at 200° C. for 30 minutes; then, cross-cut having a depth that reaches a base iron was applied at 1 mm intervals; a retort process was applied at 125° C. for 30 minutes and the test piece was dried; the coated film was detached with a tape; and, a detached state was evaluated in four grades (A: No detachment was found, B: Minor detachment occurred but practically ignorable, C: Minor detachment occurred, and D: Mostly detached).

(F) Resistance to Corrosion Under a Coated Film

An epoxy-phenolic resin was applied to the test materials; the rein was baked at 200° C. for 30 minutes; then, cross-cut having a depth that reaches a base iron was applied; the test material was immersed in a test solution containing a combination of 1.5% citric acid-1.5% salt at 45° C. for 72 hours, and was cleaned; after the test material was dried, tape detachment was performed; and in terms of corrosion states under coated film at a cross-cut portion and corrosion states at a flat portion, evaluation was performed in four grades (A: No corrosion under coated film was found, B: Minor corrosion under coated film was found but practically ignorable, C: Minor corrosion under coated film and minor corrosion at flat portion were found, and D: Severe corrosion under coated film and corrosion at flat portion were found).

(G) Non-Lacquering Corrosion Resistance

The test materials were immersed in a 1.5% citric acid solution at 30° C. for 48 hours, and uniformity of Sn melting was evaluated by judging occurrence state of tin crystal in four grades (A: Tin crystal can be clearly found on entire surface, B: Tin crystal can be found on almost entire surface, C: Tin crystals can partially be found, and D: Tin crystals can hardly be found).

(H) Sulphide Staining Resistance

The test materials were immersed in a test solution (0.056% cysteine hydrochloride, 0.4% potassium dihydrogen phosphate, 0.81% sodium phosphate) at 121° C. for one hour, and a discoloration (blackening) state was evaluated in four grades (A: Almost no discoloration was found, B: Minor discoloration was found but practically ignorable, C: Severe discoloration was partially found, and D: Severe discoloration was found in a large part).

(I) After-Retort Rust Resistance

The test materials were subjected to a retort process at 125° C. for 30 minutes, and a rust occurrence state was evaluated in four grades (A: No rust occurred, B: Minor rust was found but practically ignorable, C: Minor rust was found, and D: Rust occurred in a large part).

(J) Wettability

A commercially available test solution for wet surface-tension was applied to the test materials; evaluation was made on the basis of a limit tensile force of test solution at which the test solution starts to repel was evaluated; and wettability was evaluated in three grades (A: 35 mN/m or more, B: 31 mN/m or more, and D: 30 mN/m or less) based on the magnitude of the tensile force.

TABLE 1

|  | Type of base sheet | Method of manufacturing base sheet |
|---|---|---|
| Base sheet 1 | Steel sheet | Cold rolling - annealing - temper rolling - degreasing - pickling |
| Base sheet 2 | Sn-plated steel sheet | Cold rolling - annealing - temper rolling - degreasing - pickling<br>Sn plating with ferrostan bath (amount of Sn ion of 20 g/l) |
| Base sheet 3 | Ni-plated steel sheet | Cold rolling - annealing - temper rolling - degreasing - pickling<br>Ni plating with watts bath (amount of Ni ion of 50 g/l) |
| Base sheet 4 | Ni + Sn plated steel sheet | Cold rolling - annealing - temper rolling - degreasing - pickling<br>Ni plating with watts bath (amount of Ni ion of 50 g/l)<br>Sn plating with ferrostan bath (amount of Sn ion of 20 g/l) |
| Base sheet 5 | Ni (diffusion) plated steel sheet | Cold rolling<br>Ni plating with watts bath (amount of Ni ion of 50 g/l)<br>diffuse Ni through annealing - temper rolling |
| Base sheet 6 | Ni (diffusion) + Sn plated steel sheet | Cold rolling<br>Ni plating with watts bath (amount of Ni ion of 50 g/l)<br>diffuse Ni through annealing - temper rolling<br>Sn plating with ferrostan bath (amount of Sn ion of 20 g/l) |
| Base sheet 7 | Fe—Ni alloy plated steel sheet | Cold rolling - annealing - temper rolling - degreasing - pickling<br>Fe—Ni plating with sulfuric acid - hydrochloric acid bath (amount of Fe ion 20 g/l, amount of Ni ion 70 g/l) |
| Base sheet 8 | Fe—Ni alloy + Sn plated steel sheet | Cold rolling - annealing - temper rolling - degreasing - pickling<br>Fe—Ni plating with sulfuric acid - hydrochloric acid bath (amount of Fe ion 20 g/l, amount of Ni ion 70 g/l)<br>Sn plating with ferrostan bath (amount of Sn ion of 20 g/l) |
| Base sheet 9 | Ni—Sn alloy plated steel sheet | Cold rolling - annealing - temper rolling - degreasing - pickling<br>Ni—Sn plating with sulfuric acid-hydrochloric acid bath (amount of Sn ion 20 g/l, amount of Ni ion 70 g/l) |

TABLE 2A

|  | Base sheet | Type of base sheet | Electric heating + Hot water cooling |
|---|---|---|---|
| Example 1 | Base sheet 1 | Steel sheet |  |
| Example 2 | Base sheet 1 | Steel sheet |  |
| Example 3 | Base sheet 1 | Steel sheet |  |
| Example 4 | Base sheet 1 | Steel sheet |  |
| Example 5 | Base sheet 1 | Steel sheet |  |
| Example 6 | Base sheet 1 | Steel sheet |  |
| Example 7 | Base sheet 1 | Steel sheet |  |
| Example 8 | Base sheet 1 | Steel sheet |  |
| Example 9 | Base sheet 2 | Sn-plated steel sheet | Applied |
| Example 10 | Base sheet 2 | Sn-plated steel sheet |  |
| Example 11 | Base sheet 2 | Sn-plated steel sheet | Applied |
| Example 12 | Base sheet 2 | Sn-plated steel sheet | Applied |
| Example 13 | Base sheet 2 | Sn-plated steel sheet | Applied |
| Example 14 | Base sheet 2 | Sn-plated steel sheet | Applied |
| Example 15 | Base sheet 2 | Sn-plated steel sheet | Applied |
| Example 16 | Base sheet 3 | Ni-plated steel sheet |  |
| Example 17 | Base sheet 3 | Ni-plated steel sheet |  |
| Example 18 | Base sheet 3 | Ni-plated steel sheet |  |
| Example 19 | Base sheet 5 | Ni (diffused) plated steel sheet |  |

TABLE 2B

|  | Base sheet | Type of base sheet | Electric heating + Hot water cooling |
|---|---|---|---|
| Example 20 | Base sheet 5 | Ni (diffused) plated steel sheet |  |
| Example 21 | Base sheet 7 | Fe—Ni alloy plated steel sheet |  |
| Example 22 | Base sheet 7 | Fe—Ni alloy plated steel sheet |  |

TABLE 2B-continued

|  | Base sheet | Type of base sheet | Electric heating + Hot water cooling |
|---|---|---|---|
| Example 23 | Base sheet 4 | Ni + Sn plated steel sheet | Applied |
| Example 24 | Base sheet 4 | Ni + Sn plated steel sheet | Applied |
| Example 25 | Base sheet 6 | Ni (diffuse) + Sn plated steel sheet | Applied |
| Example 26 | Base sheet 6 | Ni (diffuse) + Sn plated steel sheet |  |
| Example 27 | Base sheet 8 | Fe—Ni alloy + Sn plated steel sheet | Applied |
| Example 28 | Base sheet 8 | Fe—Ni alloy + Sn plated steel sheet | Applied |
| Example 29 | Base sheet 9 | Ni—Sn alloy plated steel sheet |  |
| Comp. Example 1 | Base sheet 2 | Sn-plated steel sheet | Applied |
| Comp. Example 2 | Base sheet 4 | Ni + Sn plated steel sheet |  |
| Comp. Example 3 | Base sheet 1 | Steel sheet |  |
| Comp. Example 4 | Base sheet 3 | Ni plated steel sheet |  |
| Comp. Example 5 | Base sheet 5 | Ni (diffused) plated steel sheet |  |
| Comp. Example 6 | Base sheet 6 | Ni (diffused) + Sn plated steel sheet | Applied |
| Comp. Example 7 | Base sheet 8 | Fe—Ni alloy + Sn plated steel sheet |  |
| Comp. Example 8 | Base sheet 3 | Ni-plated steel sheet |  |

TABLE 3A

Conditions for treatment of composite film

Electrolysis process

|  | Process duration (Sec) | Electric current density (A/dm$^2$) | Zr ion (ppm) | Nitric acid ion (ppm) | Ammonium ion (ppm) | Phosphoric acid (ppm) | Phenolic resin (ppm) | F ion (ppm) | Sn ion (ppm) | Fe ion (ppm) | Ni ion (ppm) | Water cleaning treatment |
|---|---|---|---|---|---|---|---|---|---|---|---|---|
| Example 1 | 12.9 | 40.0 | 4900 | 17900 | 20000 | — |  |  | 10200 |  |  | (a) |
| Example 2 | 10.4 | 16.0 | 14700 | 5500 | 7700 | 33600 |  |  |  | 78 | 18370 | (a) |
| Example 3 | 3.2 | 45.0 | 15500 | 7300 | 15900 | 26800 |  |  | 24490 |  |  | (a) |
| Example 4 | 7.4 | 9.0 | 13100 | 10000 | 13800 | 40400 |  |  | 9370 |  | 2000 | (a) |
| Example 5 | 13.9 | 31.0 | 18700 | 13400 | 10900 | — |  |  |  | 1050 |  | (a) |
| Example 6 | 14.9 | 16.0 | 6500 | 17000 | 5300 | 45500 |  |  | 380 |  |  | (a) |
| Example 7 | 19.6 | 2.0 | 18200 | 11500 | 13800 | — | 990 | 10200 |  |  | 20920 | (a) |
| Example 8 | 4.4 | 8.0 | 1900 | 14600 | 19400 | 4600 | 1500 | 23700 | 6140 |  | 20390 | (a) |
| Example 9 | 12.8 | 9.0 | 2100 | 4400 | 6600 | — |  |  | 150 |  |  | (a) |
| Example 10 | 3.7 | 42.0 | 5400 | 10400 | 6200 | — |  |  | 640 | 45 |  | (a) |
| Example 11 | 8.9 | 43.0 | 11600 | 19600 | 13000 | 34700 |  |  | 1270 |  |  | (a) |
| Example 12 | 13.2 | 46.0 | 8700 | 10300 | 2900 |  |  |  | 980 |  |  | (a) |
| Example 13 | 15.4 | 25.0 | 300 | 10100 | 19500 | 30300 |  |  | 590 |  |  | (a) |
| Example 14 | 0.9 | 50.0 | 10400 | 13200 | 10400 | 4800 | 700 |  | 3050 |  |  | (a) |
| Example 15 | 13.3 | 31.0 | 6900 | 19200 | 11100 | 15200 | 1660 | 26000 | 350 |  | 420 | (a) |
| Example 16 | 11.0 | 23.0 | 8900 | 8000 | 7200 |  |  |  |  |  | 350 | (a) |
| Example 17 | 18.8 | 19.0 | 13800 | 4900 | 17100 |  |  |  |  |  | 940 | (a) |
| Example 18 | 8.2 | 42.0 | 8600 | 4300 | 5100 | 33300 |  |  |  | 24 | 279 | (a) |
| Example 19 | 12.6 | 4.0 | 11600 | 10700 | 7600 |  |  |  |  |  | 410 | (a) |

TABLE 3B

Conditions for treatment of composite film

Electrolysis process

|  | Process duration (Sec) | Electric current density (A/dm$^2$) | Zr ion (ppm) | Nitric acid ion (ppm) | Ammonium ion (ppm) | Phosphoric acid (ppm) | Phenolic resin (ppm) | F ion (ppm) | Sn ion (ppm) | Fe ion (ppm) | Ni ion (ppm) | Water cleaning treatment |
|---|---|---|---|---|---|---|---|---|---|---|---|---|
| Example 20 | 15.9 | 37.0 | 15700 | 19000 | 4200 | 16600 |  |  |  |  | 190 | (a) |
| Example 21 | 0.8 | 30.0 | 11100 | 9300 | 6100 | 5300 | 210 |  |  |  | 650 | (a) |
| Example 22 | 8.5 | 19.0 | 18500 | 12300 | 6300 | 20800 | 230 | 27300 | 3410 |  | 22540 | (a) |
| Example 23 | 17.3 | 30.0 | 11600 | 6700 | 17900 |  |  |  | 162 |  | 590 | (a) |
| Example 24 | 0.7 | 38.0 | 9400 | 2400 | 18200 |  |  |  | 720 |  | 96 | (a) |
| Example 25 | 14.3 | 16.0 | 3700 | 8000 | 10300 | 27400 |  |  | 1942 |  | 140 | (a) |
| Example 26 | 6.6 | 49.0 | 9800 | 13100 | 2000 |  |  |  | 193 |  | 720 | (a) |
| Example 27 | 19.5 | 42.0 | 9000 | 1300 | 15000 | 35000 |  |  | 89 | 150 | 510 | (a) |

TABLE 3B-continued

Conditions for treatment of composite film

| | Electrolysis process | | Components of treatment solution | | | | | | | | |
|---|---|---|---|---|---|---|---|---|---|---|---|
| | Process duration (Sec) | Electric current density (A/dm$^2$) | Zr ion (ppm) | Nitric acid ion (ppm) | Ammonium ion (ppm) | Phosphoric acid (ppm) | Phenolic resin (ppm) | F ion (ppm) | Sn ion (ppm) | Fe ion (ppm) | Ni ion (ppm) | Water cleaning treatment |
| Example 28 | 8.6 | 37.0 | 4200 | 19400 | 1300 | 26600 | 1370 | | 630 | | 960 | (a) |
| Example 29 | 3.0 | 5.0 | 11900 | 12900 | 20000 | 48900 | 1570 | 3200 | 204 | | 160 | (a) |
| Comp. Example 1 | 14.8 | 43.0 | 13600 | 18400 | 13500 | | | | 710 | | | (a) |
| Comp. Example 2 | 11.4 | 38.0 | 15400 | 19800 | 1700 | | | | 83 | | 17190 | (a) |
| Comp. Example 3 | 8.0 | 6.0 | 2700 | 900 | 9000 | | | | 8 | | | (a) |
| Comp. Example 4 | 4.2 | 4.0 | 2500 | 5400 | 1700 | 41300 | | | | 7 | 8 | (a) |
| Comp. Example 5 | 6.5 | 7.0 | 4400 | 7500 | 2400 | 17400 | 760 | | 9830 | | | (a) |
| Comp. Example 6 | 13.2 | 36.0 | 16900 | 7900 | 17200 | 19500 | | | 12220 | | 570 | (a) |
| Comp. Example 7 | 18.5 | 41.0 | 3600 | 9200 | 800 | | | 11200 | 24490 | | | (b) |
| Comp. Example 8 | 3.5 | 47.0 | 15000 | 10300 | 6700 | | | | 11670 | | 21560 | (b) |

TABLE 4A

Attached amount

| | Amount of Zr attached (mg/m$^2$) | Amount of P attached (mg/m$^2$) | Amount of C attached (mg/m$^2$) | Amount of F attached (mg/m$^2$) | Amount of Sn attached (mg/m$^2$) | Amount of Fe attached (mg/m$^2$) | Amount of Ni attached (mg/m$^2$) |
|---|---|---|---|---|---|---|---|
| Example 1 | 68.0 | | | | 19.3 | | |
| Example 2 | 21.8 | 28.4 | | | | 26 | 1261 |
| Example 3 | 61.9 | 24.5 | | | 17.2 | | |
| Example 4 | 20.1 | 11.5 | | | 6.3 | | 1127 |
| Example 5 | 58.8 | | | | | 560 | |
| Example 6 | 35.4 | 40.8 | | | 4.9 | | |
| Example 7 | 99.8 | | 23.0 | 0.07 | | | 1391 |
| Example 8 | 40.2 | 0.2 | 37.9 | 0.09 | 15.0 | | 142 |
| Example 9 | 48.3 | | | | 12.1 | | |
| Example 10 | 1.9 | | | | 0.9 | 9 | |
| Example 11 | 13.2 | 1.0 | | | 19.1 | | |
| Example 12 | 61.2 | | | | 8.0 | | |
| Example 13 | 6.6 | 9.8 | | | 2.3 | | |
| Example 14 | 16.2 | 4.3 | 0.2 | | 17.6 | | |
| Example 15 | 24.6 | 11.2 | 12.5 | 0.08 | 5.3 | | 1504 |
| Example 16 | 0.3 | | | | | | 1925 |
| Example 17 | 63.4 | | | | | | 51 |
| Example 18 | 33.3 | 6.6 | | | | 11 | 126 |
| Example 19 | 1.4 | | | | | | 751 |

TABLE 4B

Attached amount

| | Amount of Zr attached (mg/m$^2$) | Amount of P attached (mg/m$^2$) | Amount of C attached (mg/m$^2$) | Amount of F attached (mg/m$^2$) | Amount of Sn attached (mg/m$^2$) | Amount of Fe attached (mg/m$^2$) | Amount of Ni attached (mg/m$^2$) |
|---|---|---|---|---|---|---|---|
| Example 20 | 6.6 | 3.6 | | | | | 612 |
| Example 21 | 8.9 | 3.9 | 8.2 | | | | 1601 |
| Example 22 | 41.4 | 30.8 | 27.1 | 0.09 | 17.4 | | 1864 |
| Example 23 | 73.3 | | | | 17.5 | | 7.6 |
| Example 24 | 65.0 | | | | 3.1 | | 3 |
| Example 25 | 7.5 | 2.4 | | | 16.1 | | 7 |
| Example 26 | 60.1 | | | | 11.6 | | 15.9 |
| Example 27 | 1.7 | 32.2 | | | 10.2 | 140 | 19.3 |
| Example 28 | 90.2 | 40.1 | 1.8 | | 6.5 | | 5 |
| Example 29 | 46.7 | 18.1 | 6.6 | 0.09 | 6.9 | | 19 |
| Comp. Example 1 | 115.0 | | | | 10.5 | | |
| Comp. Example 2 | 0.06 | | | | 17.4 | | 1886 |
| Comp. Example 3 | 55.6 | | | | 0.2 | | |
| Comp. Example 4 | 85.7 | 17.5 | | | | 3 | 2 |

TABLE 4B-continued

| | Attached amount | | | | | | |
|---|---|---|---|---|---|---|---|
| | Amount of Zr attached (mg/m²) | Amount of P attached (mg/m²) | Amount of C attached (mg/m²) | Amount of F attached (mg/m²) | Amount of Sn attached (mg/m²) | Amount of Fe attached (mg/m²) | Amount of Ni attached (mg/m²) |
| Comp. Example 5 | 81.8 | 56.0 | 58.0 | | 11.1 | | |
| Comp. Example 6 | 30.3 | 7.4 | | | 10.7 | | 1789 |
| Comp. Example 7 | 84.9 | | | 0.30 | 15.8 | | |
| Comp. Example 8 | 43.2 | | | | 9.5 | | 1148 |

TABLE 5A

| | Evaluation | | | | | | | | | |
|---|---|---|---|---|---|---|---|---|---|---|
| | Can-making workability | Weldability | Film adhesive property | Primary-paint adhesive property | Secondary-paint adhesive property | Resistance to corrosion under a coated film | Non-lacquering corrosion resistance | Sulphide staining resistance | After-retort rust resistance | Wettability |
| Example 1 | B | B | B | A | B | B | A | A | B | A |
| Example 2 | A-B | A | A-B | A | A-B | A-B | — | A | A-B | A |
| Example 3 | A-B | A | A-B | A | A-B | A-B | A | A | A-B | A |
| Example 4 | A-B | A | A-B | A | A-B | A-B | A | A | A-B | A |
| Example 5 | A-B | A | A-B | A | A-B | A-B | — | A | A-B | A |
| Example 6 | A | A | A | A | A | A | A | A | A | A |
| Example 7 | A | A | A | A | A | A | — | A | A | A |
| Example 8 | A | A | A | A | A | A | A | A | A | A |
| Example 9 | B | A | B | A | B | B | A | A | B | A |
| Example 10 | B | A | B | A | B | A-B | B | A | B | A |
| Example 11 | A-B | A | A-B | A | A-B | A-B | A | A | A-B | A |
| Example 12 | A-B | A | A-B | A | A-B | A-B | A | A | A-B | A |
| Example 13 | A | A | A | A | A | A | A | A | A | A |
| Example 14 | A | A | A | A | A | A | A | A | A | A |
| Example 15 | A | A | A | A | A | A | A | A | A | A |
| Example 16 | B | A | B | B | B | B | — | A | B | A |
| Example 17 | B | B | B | A | B | A-B | — | A | B | A |
| Example 18 | A-B | A | A-B | A | A-B | A-B | — | A | A-B | A |
| Example 19 | A-B | A | A-B | A | A-B | A-B | — | A | A-B | A |

TABLE 5B

| | Evaluation | | | | | | | | | |
|---|---|---|---|---|---|---|---|---|---|---|
| | Can-making workability | Weldability | Film adhesive property | Primary-paint adhesive property | Secondary-paint adhesive property | Resistance to corrosion under a coated film | Non-lacquering corrosion resistance | Sulphide staining resistance | After-retort rust resistance | Wettability |
| Example 20 | A | A | A | A | A | A | — | A | A | A |
| Example 21 | A | A | A | A | A | A | — | A | A | A |
| Example 22 | A | A | A | A | A | A | A | A | A | A |
| Example 23 | A | A | A | A | A | A | A | A | A | A |
| Example 24 | A | A | A | A | A | A-B | A | A | A | A |
| Example 25 | A-B | A | A-B | A | A-B | A-B | A | A | A-B | A |
| Example 26 | A-B | A | A-B | A | A-B | A-B | A | A | A-B | A |
| Example 27 | A | A | A | A | A | A | A | A | A | A |
| Example 28 | A | A | A | A | A | A | A | A | A | A |
| Example 29 | A | A | A | A | A | A | A | A | A | A |
| Comp. Example 1 | C | D | A | A | A | A | C-D | A | A | A |
| Comp. Example 2 | D | A | D | D | D | D | A | D | B | C |
| Comp. Example 3 | D | D | D | D | D | D | C | B | B | A |
| Comp. Example 4 | C-D | C-D | C-D | C-D | C-D | C-D | — | A | A | A |
| Comp. Example 5 | D | D | C-D | C-D | C-D | B | C | B | B | A |
| Comp. Example 6 | A | D | A | A | A | A | A | A | A | A |
| Comp. Example 7 | A | A | A | A | A | D | A | A | D | D |
| Comp. Example 8 | A | A | A | A | A | A | A | A | A | D |

It can be found that Examples 1 to 29 according to the present invention exhibited excellent can-making workability, weldability, film adhesive properties, primary-paint adhesive properties, secondary-paint adhesive properties, resistance to corrosion under a coated film, non-lacquering corrosion resistance, sulphide staining resistance, after-retort rust resistance, and wettability. On the other hand, it was found that Comparative Examples 1 to 8, which do not satisfy part of the requirements of the present invention, were inferior in at least one of the can-making workability, the weldability, the film adhesive properties, the primary-paint adhesive properties, the secondary-paint adhesive properties, the resistance to corrosion under a coated film, the non-lacquering corrosion resistance, the sulphide staining resistance, the after-retort rust resistance, and the wettability deteriorated.

These are detailed descriptions of preferred embodiments according to the present invention. However, the present invention is not limited the above-described examples. It is obvious that a person who has ordinary knowledge in a technical field to which the present invention belongs is able to reach various modification examples or adjustment examples within the technical scope set forth in claims, and it should be understood that these modification examples and adjustment examples naturally belong to the technical scope of the present invention.

INDUSTRIAL APPLICABILITY

The steel sheet for a container according to the present invention exhibits excellent can-making workability, weldability, film adhesive properties, primary-paint adhesive properties, secondary-paint adhesive properties, resistance to corrosion under a coated film, non-lacquering corrosion resistance, sulphide staining resistance, after-retort rust resistance, and wettability, and in particular, is useful as a steel sheet for a laminate-filmed container.

REFERENCE SIGNS LIST

A Cold-rolled steel sheet
B Plating
C Composite film
S Steel sheet for a container
1-9 Base sheet

The invention claimed is:
1. A steel sheet for a container, the steel sheet comprising
  a cold-rolled steel sheet or a cold-rolled steel sheet plated with at least one metal selected from the group consisting of Sn, Fe and Ni, and
  a composite film formed on the cold-rolled steel sheet or the plated cold-rolled steel sheet through an electrolysis process in a solution containing:
    at least one metal ion selected from the group consisting of a Sn ion, an Fe ion, and a Ni ion;
    a Zr ion;
    a nitrate ion; and
    an ammonium ion; and
    at least one of a phosphate ion and a phenolic resin,
  wherein the composite film is simultaneously precipitated through the electrolysis process,
  wherein the composite film contains, in a single layer:
    Zr of 0.1 to 100 mg/m$^2$ in equivalent units of metal Zr,
    at least one element selected from the group consisting of:
      Sn of 0.3 to 20 g/m$^2$ in equivalent units of metal Sn;
      Fe of 5 to 2000 mg/m$^2$ in equivalent units of metal Fe; and
      Ni of 5 to 2000 mg/m$^2$ in equivalent units of metal Ni, and
    at least one of a phosphoric acid compound of 0.1 to 50 mg/m$^2$ in equivalent units of P and the phenolic resin of 0.1 to 50 mg/m$^2$ in equivalent units of C, and wherein the composite film does not substantially contain Cr.

2. The steel sheet for a container according to claim 1, wherein
  the solution for the electrolysis process further contains a fluorine ion, and
  the composite film further contains a fluorine compound of not more than 0.1 mg/m$^2$ in equivalent units of F.

3. The steel sheet for a container according to claim 1 or 2, wherein
  the composite film is formed on a plating of the plated cold-rolled steel sheet, wherein the plated cold-rolled steel sheet has at least one side surface including at least one of a Sn-plated layer containing Sn of 0.3 to 20 g/m$^2$ in equivalent units of metal Sn, and a Ni-plated layer containing Ni of 5 to 2000 mg/m$^2$ in equivalent units of metal Ni.

4. The steel sheet for a container according to claim 3, wherein
  the at least one side surface of the plated cold-rolled steel sheet has the Sn-plated layer, and
  at least part of the Sn-plated layer is alloyed with the cold-rolled steel sheet through a Sn-reflow treatment.

5. The steel sheet for a container according to claim 3, wherein
  the at least one side surface of the plated cold-rolled steel sheet has the Sn-plated layer, and
  there is provided, below the Sn-plated layer, a Ni-plated layer, an Fe—Ni alloy plated layer, or a Ni-diffusion plated layer obtained through a thermal treatment after Ni plating.

6. The steel sheet for a container according to claim 5, wherein
  the at least one side surface of the plated cold-rolled steel sheet has the Sn-plated layer, and
  all or part of the Sn-plated layer is alloyed with the cold-rolled steel sheet through a Sn-reflow treatment.

7. A method of manufacturing a steel sheet for a container, including:
  applying an electrolysis process to a cold-rolled steel sheet or a cold-rolled steel sheet plated with at least one metal selected from the group consisting of Sn, Fe and Ni in a solution for the electrolysis process containing:
    at least one metal ion of a Sn ion, an Fe ion, and a Ni ion;
    a Zr ion;
    a nitrate ion;
    an ammonium ion; and
    at least one of a phosphate ion and a phenolic resin,
  simultaneously precipitating on the cold-rolled steel sheet or the plated cold-rolled steel sheet, and forming a composite film containing, in a single layer:
    Zr of 0.1 to 100 mg/m$^2$ in equivalent units of metal Zr,
    at least one element of:
      Sn of 0.3 to 20 g/m$^2$ in equivalent units of metal Sn;
      Fe of 5 to 2000 mg/m$^2$ in equivalent units of metal Fe; and
      Ni of 5 to 2000 mg/m$^2$ in equivalent units of metal Ni, and
    at least one of a phosphoric acid compound of 0.1 to 50 mg/m$^2$ in equivalent units of P and the phenolic resin of 0.1 to 50 mg/m$^2$ in equivalent units of C, wherein the composite film does not substantially contain Cr.

8. The method of manufacturing a steel sheet for a container according to claim 7, wherein the composite film is formed on a plating of the plated cold-rolled steel sheet, and wherein the plated cold rolled steel sheet has at least one side surface including at least one of a Sn-plated layer containing Sn of 0.3 to 20 g/m² in equivalent units of metal Sn, and a Ni plated layer containing Ni of 5 to 2000 mg/m² in equivalent units of metal Ni.

9. The method of manufacturing a steel sheet for a container according to claim 8, wherein the plated cold-rolled steel sheet has said at least one side surface including the Sn-plated layer, and a Ni-plated layer, an Fe—Ni alloy plated layer, or a Ni-diffusion plated layer obtained through a thermal treatment after Ni plating is arranged under the Sn-plated layer.

10. The method of manufacturing a steel sheet for a container according to any one of claims 7, 8 and 9, further including after the composite film is formed on the cold-rolled steel sheet or the cold-rolled steel sheet plated with at least one metal selected from the from the group consisting of Sn, Fe and Ni, applying a cleaning process of an immersion process or spray process with hot water at not less than 40° C. for not less than 0.5 second.

11. The steel sheet for a container according to claim 1, wherein

Zr forms a gradation in the composite film in a film-thickness direction.

12. The method of manufacturing a steel sheet for a container according to claim 7, wherein Zr forms a gradation in a film-thickness direction.

\* \* \* \* \*